US012103636B2

(12) United States Patent
Suzuki et al.

(10) Patent No.: US 12,103,636 B2
(45) Date of Patent: Oct. 1, 2024

(54) ELECTRIC SNOWMOBILE

(71) Applicant: Yamaha Hatsudoki Kabushiki Kaisha, Shizuoka (JP)

(72) Inventors: Takehito Suzuki, Shizuoka (JP); Kensuke Osawa, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 665 days.

(21) Appl. No.: 17/377,314

(22) Filed: Jul. 15, 2021

(65) Prior Publication Data

US 2022/0017181 A1 Jan. 20, 2022

(30) Foreign Application Priority Data

Jul. 20, 2020 (JP) .................................. 2020-123580

(51) Int. Cl.
  *B62M 27/02* (2006.01)
  *B60L 1/02* (2006.01)
  *B60L 50/60* (2019.01)
  *B60L 58/27* (2019.01)

(52) U.S. Cl.
  CPC ............... *B62M 27/02* (2013.01); *B60L 1/02* (2013.01); *B60L 50/66* (2019.02); *B60L 58/27* (2019.02); *B60L 2240/545* (2013.01)

(58) Field of Classification Search
  CPC .......... B60L 1/02; B60L 1/04; B60L 2200/00; B60L 2240/545; B60L 50/66; B60L 58/27; B62J 41/00; B62J 43/00; B62K 2204/00; B62M 27/02; Y02T 10/70

USPC .......................................... 219/202; 180/68.5
  See application file for complete search history.

(56) References Cited

U.S. PATENT DOCUMENTS

| 5,490,572 | A | 2/1996 | Tajiri et al. |
| 10,597,105 | B2 | 3/2020 | Lefebvre et al. |
| 2016/0272043 | A1* | 9/2016 | Cheng ................... B60K 11/04 |
| 2020/0088089 | A1 | 3/2020 | Vezina et al. |
| 2021/0138868 | A1* | 5/2021 | Bruneau ............. H01M 10/615 |

FOREIGN PATENT DOCUMENTS

| JP | H05262144 A | 10/1993 |
| WO | WO-2019049109 A1 * | 3/2019 |

* cited by examiner

*Primary Examiner* — Dana Ross
*Assistant Examiner* — James F Sims, III
(74) *Attorney, Agent, or Firm* — HEA Law PLLC

(57) ABSTRACT

An electric snowmobile that reduces a decrease in charging efficiency is provided. The electric snowmobile includes a body frame, a driver's seat supported by the body frame, an electric motor supported by the body frame, a right ski and a left ski supported by the body frame, a track mechanism including a track belt and supported by the body frame below the driver's seat, a battery that is charged with electric power supplied from an external power source and capable of supplying the electric power to the electric motor, and a battery heater H that can be driven by electric power supplied from an external power source and heats the battery.

11 Claims, 6 Drawing Sheets

ELECTRIC SNOWMOBILE

CROSS-REFERENCE TO RELATED APPLICATION

The present application claims priority from Japanese application JP2020-123580 filed on Jul. 20, 2020, the content of which is hereby incorporated by reference into this application.

FIELD OF THE INVENTION

The present invention relates to an electric snowmobile.

BACKGROUND OF THE INVENTION

Description of the Related Art

JPH05-262144A discloses that the electric vehicle adjusts a temperature of the battery using an air conditioning function.

Here, a snowmobile traveling using an electric motor is desired in view of quietness, for example. The electric motor is driven by electric power supplied from a battery mounted on a vehicle body.

Snowmobiles are used in low-temperature environments, and charging efficiency of a battery is reduced in such environments. In order to avoid low temperature environments, it is conceivable to charge the battery indoors, but the work efficiency is lowered. Unlike passenger vehicles, snowmobiles are not provided with an air conditioning function as disclosed in JPH05-262144A, and thus cannot adjust the temperature of the battery using the air conditioning function.

One of the objects of the present disclosure is to provide an electric snowmobile that reduces a decrease in charging efficiency.

SUMMARY OF THE INVENTION (1) An electric snowmobile proposed in the present disclosure includes a body frame, a driver's seat supported by the body frame, an electric motor supported by the body frame, a ski supported by the body frame, a track mechanism, which includes a track belt, and the track mechanism being supported by the body frame below the driver's seat, a battery that is charged with electric power supplied by an external power source and capable of supplying the electric power to the electric motor, at least a part of the battery being disposed below the driver's seat and above the track mechanism, and a battery heater that can be driven by electric power supplied from the external power source and that heats the battery. This electric snowmobile prevents a decrease in charging efficiency.

(2) The electric snowmobile according to (1) includes a controller that controls charging of the battery and driving of the battery heater, wherein the controller may drive the battery heater in a case where a temperature of the battery is less than a first threshold. This enables avoiding charging in a state where charging efficiency is low.

(3) In the electric snowmobile according to (2), the controller may drive the battery heater while the external power source supplies the battery with electric power. This allows the battery to be charged while the temperature of the battery is maintained or raised.

(4) In the electric snowmobile according to (2), in a case where a voltage of the battery is equal to or higher than a second threshold, the controller may stop supplying electric power to the battery from the external power source and continue to drive the battery heater. This serves to reduce a load on the battery at the start of operating the electric snowmobile.

(5) The electric snowmobile according to (4) includes a grip that is to be gripped by a driver and a grip heater that can be driven by electric power supplied from the external power source and that heats the grip, wherein when a voltage of the battery is equal to or higher than a third threshold, the controller may drive the grip heater. This makes it possible to prioritize the heating of the grip heater.

(6) The electric snowmobile according to (5) includes a sheet heater that can be driven by electric power supplied from the external power source and that heats the driver's seat, wherein when a voltage of the battery is equal to or higher than the third threshold, the controller may drive the sheet heater. This makes it possible to prioritize the heating of the sheet heater.

(7) In the electric snowmobile according to (6), the grip heater and the sheet heater may be driven by electric power supplied from the battery. This makes it possible to heat the grip heater and the sheet heater when the electric snowmobile is in a disconnected state from the external power source.

(8) In the electric snowmobile according to (6), wherein when a voltage of the battery is equal to or higher than the second threshold, the controller may stop supplying electric power to the battery from the external power source and continue to drive the grip heater and the sheet heater. This makes it possible to prioritize the heating of the grip heater and the sheet heater.

(9) In the electric snowmobile according to (1), the battery heater may be at least provided between the driver's seat and the battery. This allows the battery heater to also serve as a seat heater and eliminates the need of separately providing a member for heating the sheet, thereby reducing the number of parts.

(10) In the electric snowmobile according to (1), the battery heater may be provided at least along a largest side surface among side surfaces of the battery. This makes it possible to efficiently heat the battery.

(11) In the electric snowmobile according to (1), the battery may have a substantially rectangular shape including a front surface, a rear surface, an upper surface, a lower surface, a right surface, and a left surface, and the battery may be supported by the body frame such that widths of the upper surface, the lower surface, the right surface, and the left surface in a vehicle longitudinal direction are longer than widths of the front surface and the rear surface in a vehicle width direction, and the battery heater may be provided at least along the upper surface, the right surface, and the left surface. This makes it possible to more efficiently heat the battery.

DETAILED DESCRIPTION OF THE INVENTION

An embodiment of the present invention (hereinafter, referred to as "present embodiment") will be described below in detail with reference to the accompanying drawings.

Figure 1:
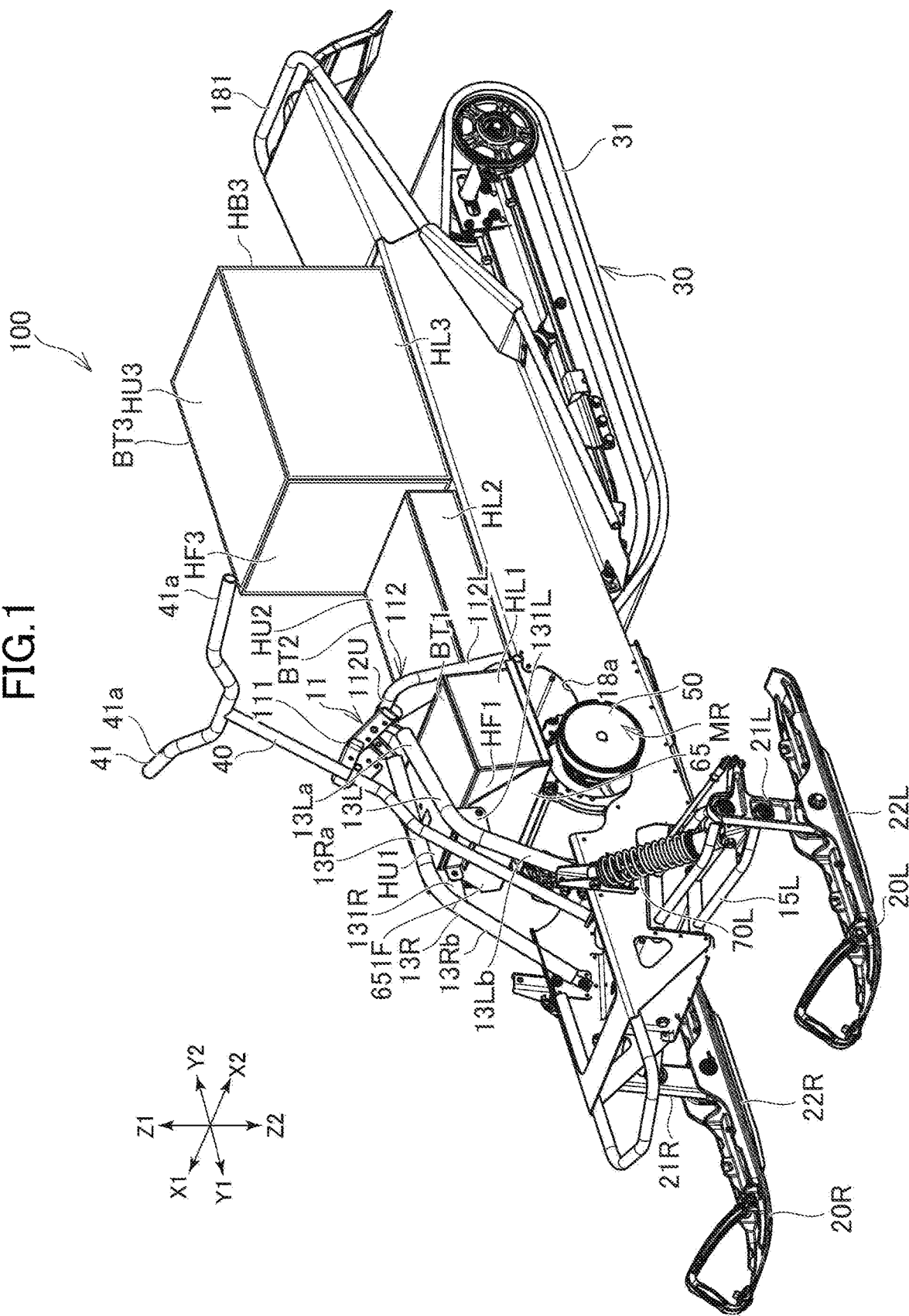
FIG. 1 is a perspective view of an electric snowmobile according to the present embodiment seen obliquely from above on a front side of the electric snowmobile.
Figure 2:
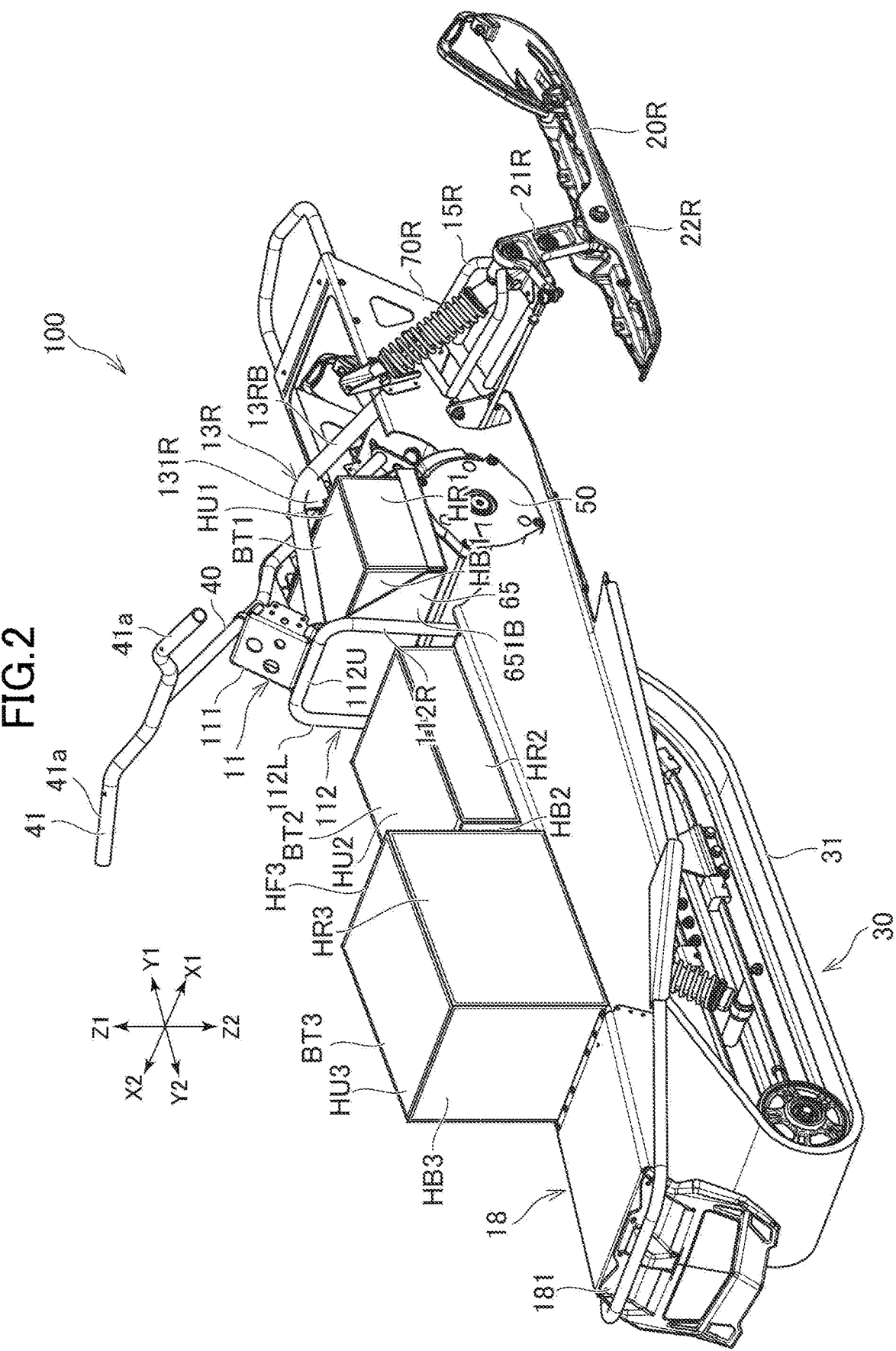
FIG. 2 is a perspective view of the electric snowmobile according to the present embodiment seen obliquely from above on a rear side of the electric snowmobile.
Figure 3:
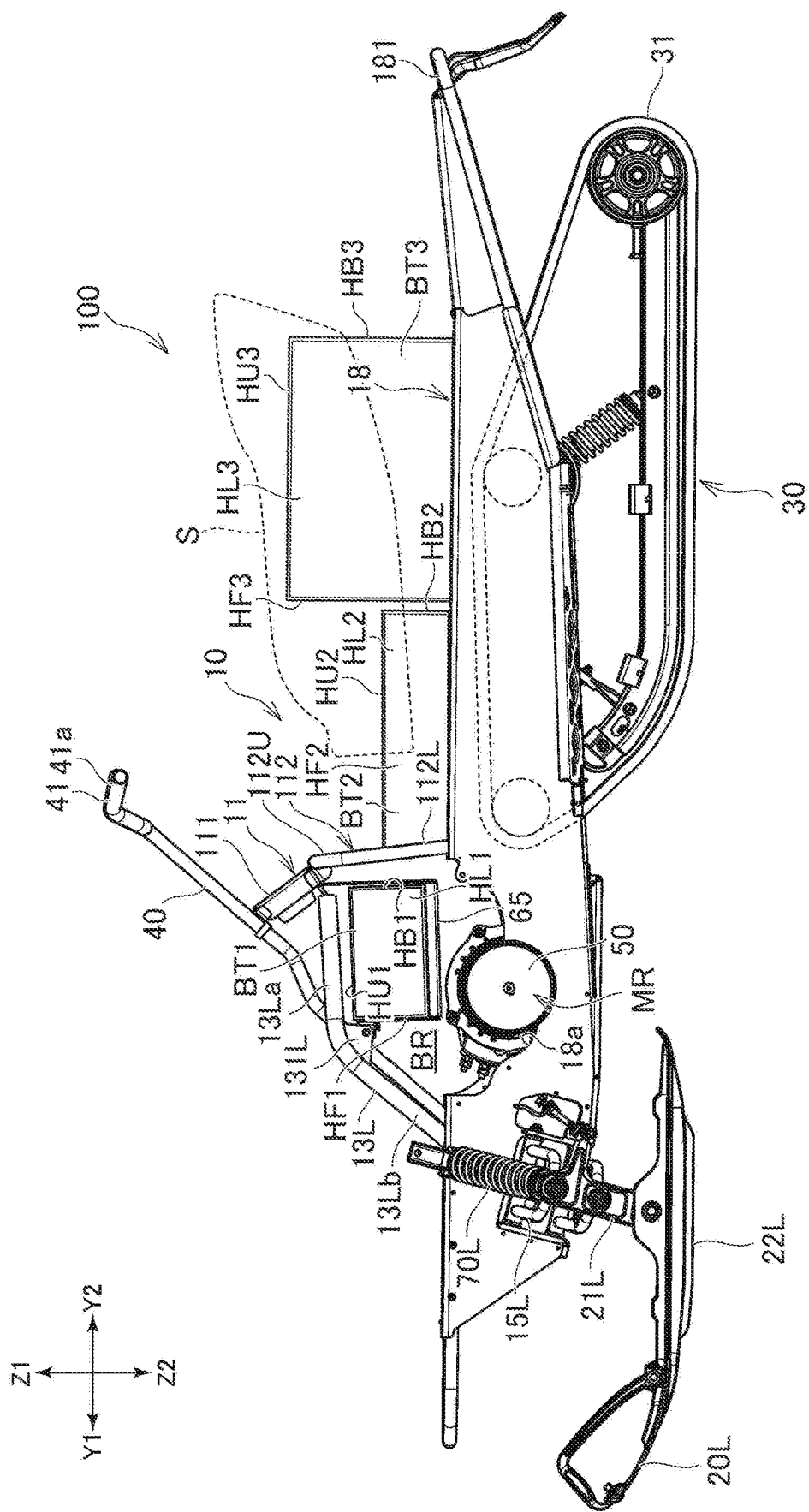
FIG. 3 is a side view of the electric snowmobile according to the present embodiment seen from the left.
Figure 4:
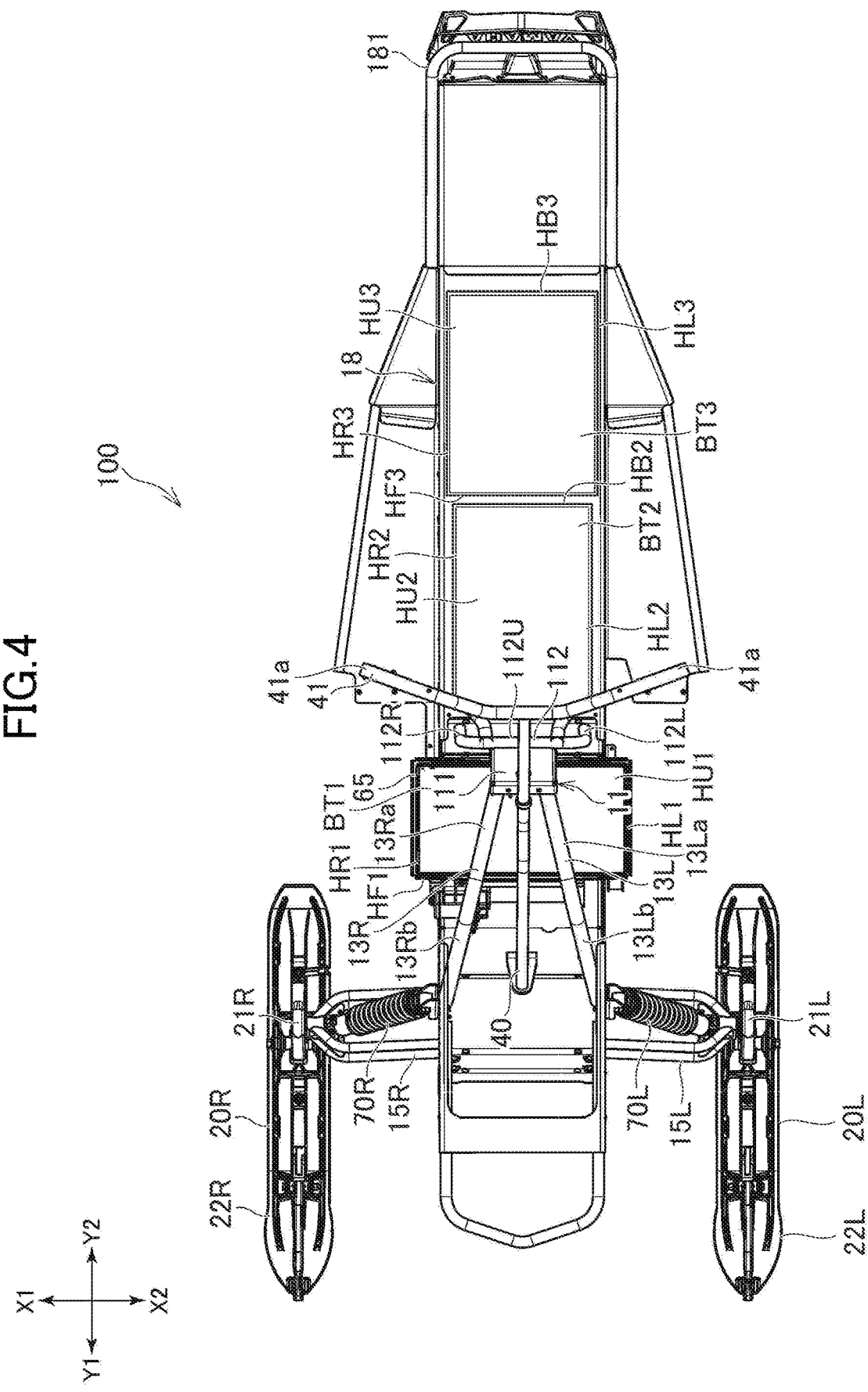
FIG. 4 is a top view of the electric snowmobile according to the present embodiment.

FIG. 1 is a perspective view of an electric snowmobile according to the present embodiment seen obliquely from above on a front side of the electric snowmobile. FIG. 2 is a perspective view of the electric snowmobile according to the present embodiment seen obliquely from above on a rear side of the electric snowmobile. FIG. 3 is a side view of the electric snowmobile according to the present embodiment seen from the left. FIG. 4 is a top view of the electric snowmobile according to the present embodiment.

In the following description, the directions indicated by Y1 and Y2 in the respective drawings are referred to as a front direction and a rear direction, respectively. The directions indicated by X1 and X2 are referred to as a right direction and a left direction, respectively. The direction indicated by Z1 and Z2 are referred to as an upward direction and a downward direction, respectively.

In the present specification, the term "supported" ("support") is used not only to indicate that a first member is directly attached to and supported by (supports) a second member, but also to indicate that the first member is attached to a third member and is supported by the second member via the third member.

[Outline of Electric Snowmobile 100]

An electric snowmobile 100 is a straddled vehicle that travels mainly on the snow. The electric snowmobile 100 drives an electric motor 50 by power supplied from the batteries BT1, BT2, and BT3, thereby traveling.

The batteries BT1, BT2, and BT3 may be rechargeable, such as a lithium-ion battery. In the following, each battery is simply referred to as a "battery BT" when it is not necessary to distinguish the batteries from each other. Each of the batteries BT may be composed of a battery cell assembly.

In each drawing, an outer cover and a driver's seat are omitted so that a body frame 10 forming the skeleton of the vehicle body and the batteries BT1, BT2, and BT3 can be visually recognized. Further, an inverter for controlling the electric motor 50 is also omitted. FIG. 3 shows the driver's seat S by a broken line.

The snowmobile 100 includes a body frame 10, a right ski 20R, a left ski 20L, a track mechanism 30, a steering shaft 40, an electric motor 50, and batteries BT1, BT2, and BT3.

[Body Frame 10]

The body frame 10 forms the skeleton of the vehicle body and also supports each component of the electric snowmobile 100. Specifically, the body frame 10 supports the right ski 20R, the left ski 20L, the track mechanism 30, the steering shaft 40, the electric motor 50, and the batteries BT1, BT2, and BT3.

The body frame 10 includes an upper frame mainly composed of pipe-shaped members. The upper frame includes a shaft support frame 11, a right front frame 13R, and a left front frame 13L.

The body frame 10 includes a lower frame 18 that supports a lower end of the pipe-shaped upper frame. The lower frame 18 extends in the front-rear direction, and supports the lower end of the upper frame at its front portion, and a bumper 181 is provided at its rear portion. The driver's seat S is supported by a portion of the lower frame 18 rearward of the front portion for supporting the lower end of the upper frame and forward of the bumper 181.

The steering shaft 40 extends upwardly and rearwardly. The lower end of the steering shaft 40 is rotatably supported by the lower frame 18, and a steering handle 41 is provided at the upper end of the steering shaft 40. The steering handle 41 includes grips 41a to be gripped by a driver. The steering shaft 40 is also rotatably supported by a shaft support frame 11 at the middle of its lower end and upper end.

The shaft support frame 11 includes a support portion 111 and an auxiliary frame 112 to which the support portion 111 is attached.

As shown in FIG. 3, the support portion 111 extends rearwardly and downwardly in a side view and its front end rotatably supports the steering shaft 40.

The auxiliary frame 112 has an inverted U-shape composed of an upper portion 112U to which the supporting portion 111 is attached and extends in the left-right direction, a right portion 112R extending rightward and downward from the upper portion 112U, and a left portion 112L extending leftward and downward from the upper portion 112U. The lower ends of the right portion 112R and the left portion 112L are supported by the lower frame 18.

The right front frame 13R includes a forward extending portion 13Ra extending forwardly from the shaft support frame 11 and an inclined portion 13Rb extending forwardly and downwardly from the forward extending portion 13Ra.

The left front frame 13L includes a forward extending portion 13La extending forwardly from the shaft support frame 11, and an inclined portion 13Lb extending forwardly and downwardly from the forward extending portion 13La.

The right front frame 13R and the left front frame 13L are provided to be spaced apart from each other in the vehicle width direction.

As shown in FIG. 4, the right front frame 13R is inclined in the right direction toward the front. The left front frame 13L is inclined in the left direction toward the front. That is, the right front frame 13R and the left front frame 13L are provided so as to be spaced apart from each other toward the front.

The body frame 10 further includes a right ski support frame 15R and a left ski support frame 15L. The right ski support frame 15R extends rightward at the front portion of the lower frame 18 and supports the right ski 20R at its right end. The left ski support frame 15L extends leftward at the front portion of the lower frame 18 and supports the left ski 20L at its left end.

The frames and the portions forming the body frame 10 may be formed integrally, or may be separated and fixed to each other by coupling means such as bolts or welding or other known methods. Further, the frames and the portions forming the body frame 10 may be made of resin and integrally formed with each other.

[Right Ski 20R, Left Ski 20L]

The right ski 20R is composed of a supported portion 21R supported by the right ski support frame 15R and extending downward, and a plate portion 22R attached to the lower end of the supported portion 21R. Similarly, the left ski 20L is composed of a supported portion 21L supported by the left ski support frame 15L and extending downward, and a plate portion 22L attached to the lower end of the supported portion 21L.

In the present embodiment, suspensions 70R and 70L each having a spring structure and a damper are provided so as to cross the right ski 20R, the left ski 20L, and the lower frame 18.

[Track Mechanism 30]

The track mechanism 30 is supported by the lower frame 18 more rearward than the right ski 20R and the left ski 20L. The track mechanism 30 includes a track belt 31 that is rotated by the driving force of the electric motor 50. The rotation of the track belt 31 moves the vehicle body.

[Electric Motor 50]

The electric motor 50 is supported by the lower frame 18 and is disposed below the battery BT1.

In the present embodiment, the lower frame 18 has a motor housing region MR (see e.g., FIG. 1) for accommodating the electric motor 50. The motor housing region MR is a region that is recessed with respect to the upper surface of the lower frame 18, and notches 18a are formed at the left and right ends of the motor housing region MR. The left and right end portions of the electric motor 50 are fitted into the notches 18a and supported by the lower frame 18.

The motor housing region MR is formed below the battery BT1. That is, the electric motor 50 is disposed below the battery BT1. In other words, the electric motor 50 and the battery BT1 are disposed so as to at least partially overlap with each other in a top view in the front-rear direction. In this manner, the relatively heavy electric motor 50 is provided in the lower portion of the vehicle body, and thus the center of gravity of the vehicle body can be lowered. The lowered center of gravity of the vehicle body enables comfortable travel. Further, the electric motor 50 and the battery BT1 are disposed so as to overlap with each other in the front-rear direction, which serves to reduce the width of the electric snowmobile 100 in the front-rear direction.

In the present embodiment, the electric motor 50 is located more rearward than the mounting positions of the right ski 20R and the left ski 20L to the left ski support frame 15L and the right ski support frame 15R. In this manner, the relatively heavy electric motor 50 is disposed rearward, and thus the center of gravity of the vehicle body can be positioned rearward. This eases the handling of the steering handle 41 and enables comfortable travel. Further, the electric motor 50 is positioned more forward than the front end of the track belt 31. However, the present invention is not limited to this example, and at least a portion of the electric motor 50 may be positioned more forward than the track belt 31.

[Arrangement of Battery BT1 and Support Structure of Housing 65 (Battery BT1)]

In the present embodiment, the battery BT1 has a substantially cubic shape with the length in the vehicle width direction (left-right direction) larger than the width in the front-rear direction. That is, the battery BT1 is disposed such that its longitudinal direction is the vehicle width direction.

As shown in FIG. 4, the battery BT1 is provided such that the left and right ends of the battery BT1 are positioned outward of the lower ends of the right front frame 13R and the left front frame 13L in the vehicle width direction.

The battery BT1 is located more rearward than the lower end of the steering shaft 40. Further, the battery BT1 is located more forward than the steering handle 41. The battery BT1 is located more rearward than the mounting positions of the right ski 20R and the left ski 20L to the left ski support frame 15L and the right ski support frame 15R.

In this manner, the relatively heavy battery BT1 is disposed rearward, and thus the center of gravity of the vehicle body can be positioned rearward. This eases the handling of the steering handle 41 and enables comfortable travel. At least a portion of the battery BT1 may be positioned more forward than the track belt 31.

The battery BT1 is contained in a battery housing 65 (hereinafter, simply referred to as housing 65) for protecting the battery BT1. The housing 65 has a shape along the outer shape of the battery BT1. Specifically, the housing 65 includes a front sidewall 651F located along the front surface of the battery BT1 and a rear sidewall 651B located along the rear surface of the battery BT1.

In the present embodiment, the battery BT1 is disposed in a region (hereinafter referred to as a battery housing region BR) surrounded by the right front frame 13R, the left front frame 13L, and the auxiliary frame 112. As shown in FIG. 3, the battery housing region BR is a region formed by a line connecting the left front frame 13L, the auxiliary frame 112, and the lower ends of the left front frame 13L and the auxiliary frame 112, in a side view. At least a portion of the battery BT1 may be disposed in the battery housing region BR.

In the present embodiment, the housing 65 is supported by the right front frame 13R, the left front frame 13L, and the support portion 111 of the shaft support frame 11.

The battery BT1 is supported by the upper frame via the housing 65. Specifically, the battery BT1 is supported by the right front frame 13R, the left front frame 13L, and the support portion 111 of the shaft support frame 11 via the housing 65. The housing 65 is supported by the upper frame so that the top and bottom surfaces of the battery BT1 remain substantially level.

The details of the support structure of the housing 65 will be described below.

A mounting portion 131R extending downward is fixed to the right front frame 13R, and a mounting portion 131L extending downward is fixed to the left front frame 13L.

The right portion of the front side wall 651F of the housing 65 is mounted on the mounting portion 131R fixed to the right front frame 13R. That is, the housing 65 is supported by the right front frame 13R via the mounting portion 131R.

The left portion of the front wall 651F of the housing 65 is mounted on the mounting portion 131L fixed to the left front frame 13L. That is, the housing 65 is supported by the left front frame 13L via the mounting portion 131L.

The rear sidewall 651B of the housing 65 is mounted on the support portion 11 of the shaft support frame 111.

The housing 65 may be fixed to each mounting portion of the upper frame using a bolt, for example.

In the present embodiment, the battery BT1 is disposed upward of the electric motor 50 and the lower frame 18. That is, the battery BT1 is suspended in the upper frame of the body frame 10 so that the bottom surface of the battery BT1 is apart from the electric motor 50 and the lower frame 18.

The battery BT1 is thus supported by the upper frame apart from the lower frame 18, thereby avoiding contact with moisture on the lower frame 18.

As described above, in the present embodiment, the housing 65 is supported by three positions of the upper frame of the body frame 10. As such, the load of the battery BT1 and the housing 65 is dispersed at three positions of the body frame 10. This prevents the load from being locally applied to the body frame 10. Further, the battery BT1 is disposed in the region formed by the upper frame of the body frame 10, and the space is thereby effectively utilized.

In the present embodiment, the example has been described in which the housing 65 is supported via the mounting portion fixed to the upper frame, but is not limited thereto. The housing 65 may be directly mounted on the upper frame and supported.

Further, in the present embodiment, the example has been described in which the battery BT1 is indirectly supported by the body frame 10 via the housing 65, but is not limited thereto. The battery BT1 may be directly supported by the body frame 10.

The orientation of the battery BT1 is not limited to the illustrated embodiment. That is, the battery BT1 may be disposed such that the longitudinal direction of the battery BT1 is the front-rear direction.

[Batteries BT2, BT3]

The electric snowmobile 100 further includes the battery BT2 located rearward of the battery BT1 and the battery BT3 located rearward of the battery BT2. The batteries BT2 and BT3 are mounted on the upper surface of the lower frame 18.

As shown in FIG. 3, the battery BT3 is disposed below the driver's seat S. The rear portion of the battery BT2 is disposed below the driver's seat S. The driver's seat S has a shape inclining downward toward the front. The battery BT2 is made smaller than the battery BT3 so as to match such a shape. Specifically, the width of the battery BT2 in the height direction is smaller than the width of the battery BT3 in the height direction, and the width of the battery BT2 in the vehicle width direction is smaller than the width of the battery BT3 in the vehicle width direction.

In the present embodiment, the batteries BT2 and BT3 are disposed such that the longitudinal direction of the batteries BT2 and BT3 is the front-rear direction. That is, the batteries BT2 and BT3 are disposed along the lower frame 18 having a shape extending in the front-rear direction. This allows the batteries BT2 and BT3 to have a larger capacity and still to be mounted in the electric snowmobile 100. However, the present invention is not limited to this example, and the batteries BT2 and BT3 may be disposed such that the longitudinal direction thereof is the vehicle-width direction or the vertical direction.

[Battery Heater H]

The electric snowmobile 100 includes battery heaters H provided along each side of the battery BT. Specifically, battery heaters HU1, HF1, HB1, HR1, and HL1 are respectively provided on the upper, front, rear, right, and left surfaces of the battery BT1. Further, battery heaters HU2, HF2, HB2, HR2, and HL2 are respectively provided on the upper, front, rear, right, and left surfaces of the battery BT2. Further, battery heaters HU3, HF3, HB3, HR3, and HL3 are respectively provided on the upper, front, rear, right, and left surfaces of the battery BT3. In the following, each battery heater is simply referred to as a "battery heater H" when it is not necessary to distinguish the battery heaters from each other.

The battery heater H is provided to heat the battery BT. The electric snowmobile 100 is a vehicle traveling on the snow and mainly used in low temperature environments. For example, in a low temperature environment of 0° C. or less, the temperature of the battery BT is lowered, and the charging efficiency may be reduced.

As such, the present embodiment adopts a configuration for reducing a decrease in charging efficiency in which the battery BT is charged after or while the battery heater H raises the temperature of the battery BT.

In FIG. 1, for example, the battery heater H is directly attached to the side surface of the battery BT, but the present invention is not limited to this example and the battery heater H may be disposed at least along the side surface of the battery BT. For example, the battery heater H may be provided indirectly to the battery BT via other members. Further, for example, the battery BT may be contained in a battery case, and the battery heater H may be attached to an inner surface of the battery case so as to be along the side surface of the battery BT. In this case, the battery heater H may or may not be in contact with the battery BT.

Further, in the present embodiment, an example is described in which each battery heater H is substantially the same size as the size of each side surface of the battery BT. However, the present invention is not limited to this example, and each battery heater H may be large enough to heat each battery BT. In the present embodiment, the seat-type battery heater H is described as an example. However, the present invention is not limited to this example, and the battery heater H may at least have a shape and a size that can be disposed in the vicinity of the battery BT.

Further, in the present embodiment, an example is described in which the battery heaters H are provided on the respective surfaces of the batteries BT1, BT2, and BT3, but the present invention is not limited this example and at least one battery heater H may be provided. That is, for example, the battery heaters H2 and H3 may be provided only in the batteries BT2 and BT3, and the battery heater H1 may not be provided in the battery BT1. Further, for example, the battery heater H may be provided only on left and right side surfaces of each battery BT.

The battery heater H is preferably provided along at least a side surface having the largest area among the side surfaces of the battery BT. This efficiently raises the temperature of the battery BT.

[Grip Heater]

Further, the electric snowmobile 100 may include a grip heater H4 (see FIG. 5) as a peripheral heater for heating the grips 41a. The grips 41a are portions of the steering handle 41 gripped by the driver. The grips 41a may be heated by the grip heater H4 before or while the electric snowmobile 100 is being operated.

[Other Heaters]

In the present embodiment, the grip heater H4 is described as an example of the peripheral heater, however the present invention is not limited to this example. Other peripheral heaters for heating the portion in direct contact with the driver may be provided. For example, the electric snowmobile 100 may have a sheet heater for heating the driver's seat S. The seat heater may be provided below the driver's seat S along the seat surface of the driver's seat S. The battery heater HU3 provided on the upper surface of the battery BT3 may also serve as a sheet heater. The heater heating the driver's seat S is used in this manner, and thereby serves to reduce the snow in the vicinity of the driver's seat S.

[Circuit Configuration]

Figure 5:
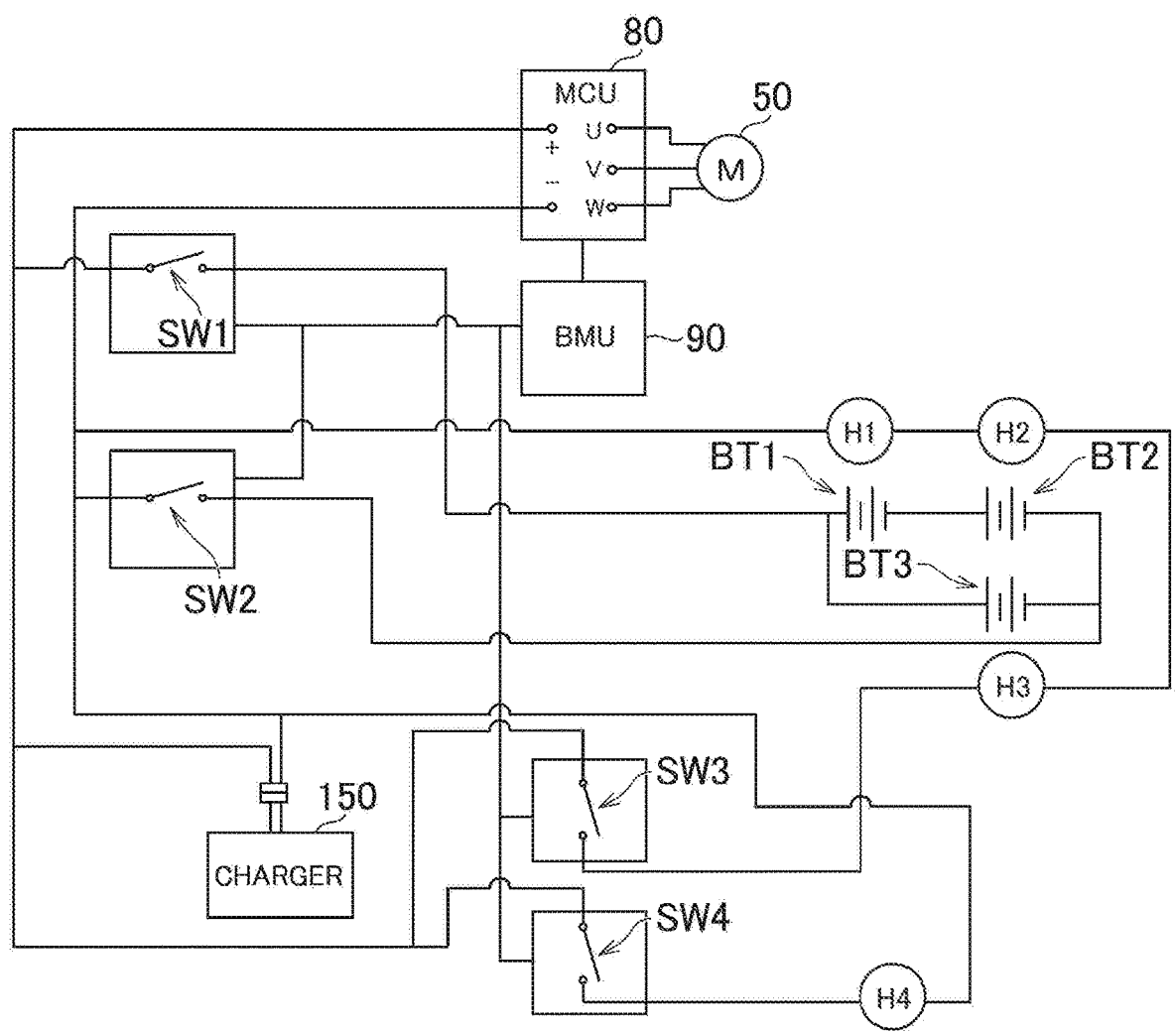
FIG. 5 is a circuit diagram illustrating an example of a circuit configuration of the electric snowmobile according to the present embodiment.

Referring to FIG. 5, a circuit configuration for performing the charging control and the driving control of each heater of the battery will be described. FIG. 5 is a circuit diagram illustrating an example of a circuit configuration of the electric snowmobile according to the present embodiment.

The battery BT is charged by electric power supplied from an external power source, such as a commercial power source. For example, the electric snowmobile 100 may have a charging port to which a plug of the charger 150 is inserted, and the battery BT may be electrically connected to the external power source via the charger 150.

Each heater is also driven by electric power supplied from an external power source similarly to the battery BT. Each heater may also be electrically connected to an external power source via the charger 150.

As shown in FIG. 5, the electric snowmobile 100 includes an MCU (Motor Control Unit) 80 and a BMU (Battery Management Unit) 90.

Although not shown, the electric snowmobile 100 may include a voltage detection circuit for detecting a voltage Vb of the battery BT, a temperature sensor for detecting a temperature Tb of the battery BT, a temperature sensor for detecting an outside air temperature To, and a temperature sensor for detecting a temperature Tg of the grip heater H4, for example.

The MCU 80 controls the driving of the electric motor 50. In FIG. 5, a so-called three-phase motor is illustrated as an example of the electric motor 50.

The BMU 90 switches connection/disconnection of switches SW1, SW2, SW3, and SW4 to control charging of the batteries BT1, BT2, and BT3, driving of the battery heaters H1, H2, and H3, and driving of the grip heater H4.

While the charger 150 is electrically connected to an external power source, the BMU 90 switches the switches SW1 and SW2 to the connected state to energize the batteries BT1, BT2, and BT3. That is, the batteries BT1, BT2, and BT3 are supplied with power from the external power source and charged. In FIG. 5, the batteries BT1 and BT2 are connected in series, and the battery BT3 is connected to the batteries BT1 and BT2 in parallel, although this connection configuration is an example and the present invention is not limited to this.

While the charger 150 is electrically connected to the external power supply, the BMU 90 switches the switch SW3 to the connected state, and the battery heaters H1, H2, and H3 are thereby energized. That is, the battery heaters H1, H2, and H3 are driven to heat the batteries BT1, BT2, and BT3 respectively. In the circuit diagram shown in FIG. 5, the battery heaters H1, H2, and H3 are energized simultaneously, although the battery heaters H1, H2, and H3 may be energized independently.

While the charger 150 is electrically connected to the external power supply, the BMU 90 switches the switch SW4 to the connected state, and the grip heater H4 is thereby energized. That is, the grip heater H4 is driven to heat the grips 41a. During operation, the driving of the grip heater H4 may be controlled by the driver sitting on the driver's seat S using a button, for example.

For example, the BMU 90 may drive the battery heater H if the temperature Tb of the battery BT is less than a predetermined threshold Tth1. This prevents the battery BT from being charged in a low temperature state. That is, this reduces a decrease in the charging efficiency of the battery BT. The threshold Tth1 (first threshold) may be, for example, −5° C. to 0° C.

The BMU 90 may also drive the battery heater H while the battery BT is supplied with power from an external power source. This allows the battery BT to be charged while the temperature Tb of the battery BT is maintained or raised. In this case, the BMU 90 may switch the switches SW1, SW2, and SW3 shown in FIG. 5 to the connected state.

If the voltage Vb of the battery BT is equal to or higher than a predetermined threshold Vth1, the BMU 90 may stop power supplied from the external power source to the battery BT and continue to drive the battery heater H. The threshold Vth1 (second threshold value) may be, for example, a voltage value at which the battery BT is 98% charged. That is, in a state where the battery BT is almost fully charged, the driving of the battery heater H may be preferably prioritized rather than the charging of the battery BT.

The BMU 90 may drive the grip heater H4 when the voltage Vb of the battery BT is equal to or higher than a predetermined threshold Vth2. The threshold Vth2 (third threshold value) may be, for example, a voltage value at which the battery BT is 60% charged. That is, in a state where the battery BT is charged to some extent, the driving of the grip heater H4 may be preferably prioritized rather than the charging of the battery BT.

When the voltage Vb of the battery BT is equal to or higher than the predetermined threshold Vth2, the BMU 90 may stop power supplied from the external power source to the battery BT and continue to drive the grip heater H4.

The grip heater H4 may be driven by the power supplied from the battery BT instead of the power supplied from the external power source. This allows the grip 41a to be heated while the charger 150 is not electrically connected to an external power source, for example, while the electric snowmobile 100 is being operated.

[Charging Control of Battery and Driving Control of Heaters]

Figure 6:
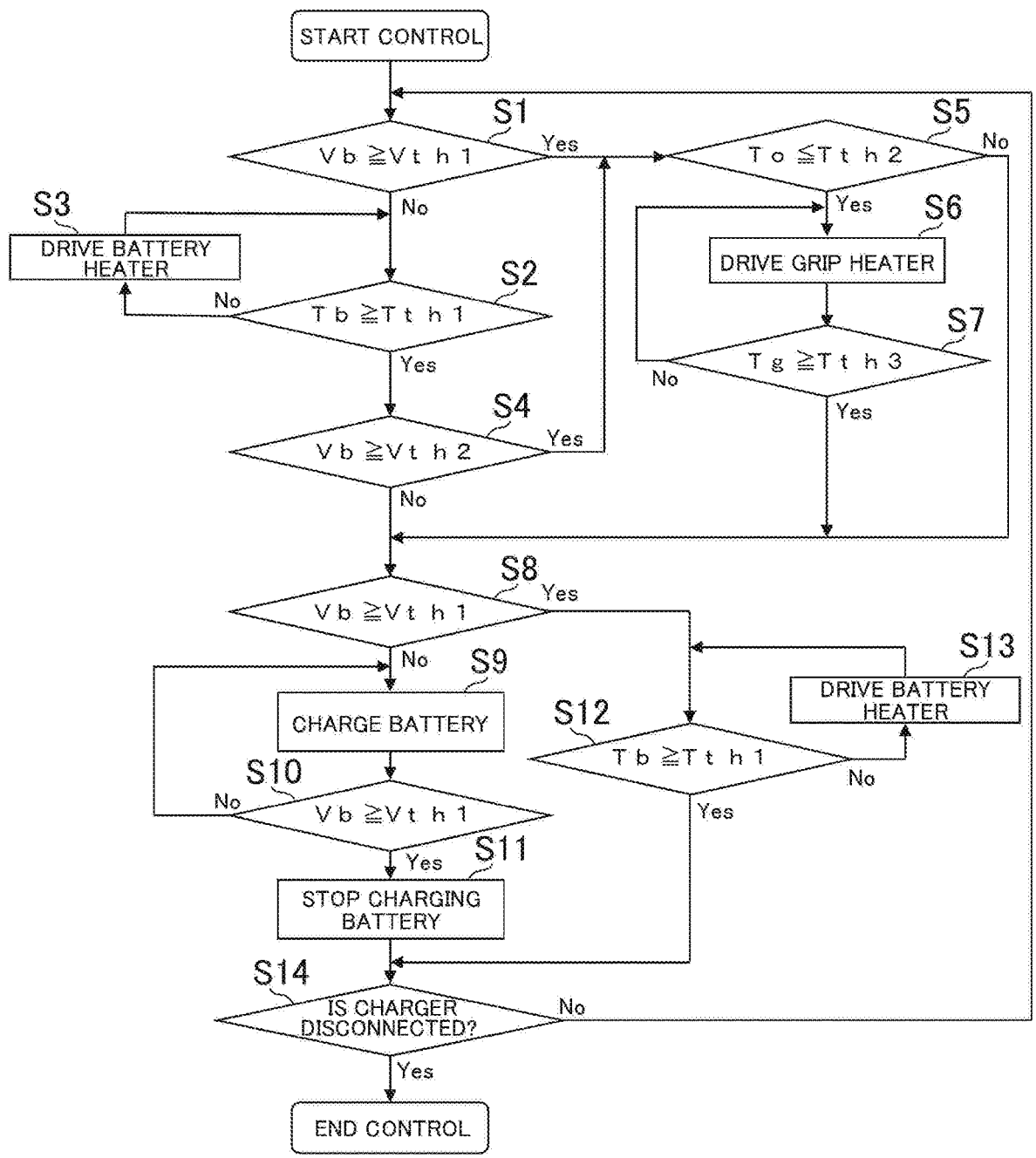
FIG. 6 is a flowchart illustrating an example of charging control of a battery and driving control of heaters according to the present embodiment.

Referring to FIG. 6, the charging control of the battery BT and driving control of the heaters in the present embodiment will be described. FIG. 6 is a flowchart illustrating an example of the charging control of the battery and the driving control of the heaters according to the present embodiment.

When the charger 150 is connected to an external power source, the BMU 90 initiates its control.

When the voltage Vb of the battery BT is less than the threshold Vth1 (voltage value at which the charge amount is 98%) (No in Step S1) and the temperature Tb of the battery BT is less than the threshold Tth1 (No in Step S2), the BMU 90 drives the battery heater H (Step S3). That is, if the temperature Tb of the battery BT is less than the threshold Tth1, the battery BT is heated by the battery heater H before the battery BT is charged. Specifically, the BMU 90 switches the switch SW3 shown in FIG. 5 to the connected state.

The driving control of the grip heater H4 is started when the temperature Tb of the battery BT heated by the battery heater H is equal to or higher than the threshold Tth1 (Yes in Step S2) and the voltage Vb of the battery BT is equal to or higher than the threshold Vth2 (voltage value at which the charge amount is 60%) (Yes in Step S4). That is, in a state where the battery BT is charged to some extent, heating the grips 41a is prioritized.

If the outside air temperature To is equal to or less than the threshold Tth2 (Yes in Step S5), the BMU 90 drives the grip heater H4 (Step S6). Specifically, the BMU 90 switches the switch SW4 shown in FIG. 5 to the connected state.

When the temperature of the grip heater H4 is equal to or higher than the threshold Tth3 (Yes in Step S7), the process proceeds to step S8 shown in FIG. 6. The threshold Tth3 may be, for example, 30° C. However, the present invention is not limited to this example, and the threshold Tth3 (third threshold) may be about 25° C. to 60° C.

If the outside air temperature To is larger than the threshold Tth2 (No in Step S5), the grip heater H4 is not driven and the process proceeds to step S8 shown in FIG. 6.

FIG. 6 shows the example in which the outside air temperature To and the temperature Tg of the grip heater H4 are detected and driving of the grip heater H4 is controlled based on the detection result, but the present invention is not limited to this example. For example, only the outside air temperature To may be detected, or the temperature of the grip 41a itself may be detected.

In Step S3, when the temperature Tb of the battery BT heated by the battery heater H is equal to or higher than the threshold Tth1 (Yes in Step S2), and the voltage Vb of the battery BT is less than the threshold Vth2 (No in Step S4), the grip heater H4 is not driven and the process proceeds to Step S8. That is, if the amount of charge of the battery BT is small, the charging of the battery BT is prioritized rather than the heating of the grips 41a.

If the voltage Vb of the battery BT is less than the threshold Vth1 (No in Step S8), the BMU 90 starts charging the battery BT (Step S9). Specifically, the BMU 90 switches the switches SW1 and SW2 shown in FIG. 5 to the connected state.

When the voltage Vb of the battery BT becomes equal to or higher than the threshold Vth1 (Yes in step S10), the BMU 90 stops charging the battery BT. The process then proceeds to step S14.

In Step S8, if the voltage Vb of the battery BT is equal to or higher than the threshold Vth1 (Yes in Step S8) and the temperature Tb of the battery BT is less than the threshold Tth1 (No in Step S12), the BMU 90 drives the battery heater H (Step S13). Specifically, the BMU 90 switches the switch SW3 shown in FIG. 5 to the connected state. If the temperature Tb of the battery BT is equal to or higher than the threshold Tth1 (Yes in step S12), the process proceeds to step S14.

If the charger 150 is not disconnected (No in Step S14), that is, the charger 150 is electrically connected to an external power supply, the process returns to Step S1 and repeats the charging control of the battery BT and the driving control of the heaters. On the other hand, if the charger 150 is disconnected (Yes in Step S14), that is, if the charger 150 is not electrically connected to an external power supply, the charging control of the battery BT and the driving control of the heaters terminate.

FIG. 6 shows the example of the grip heater H4 as a peripheral heater, although the same driving control may be performed for other peripheral heaters, such as the sheet heater described above.

The electric snowmobile 100 according to the present embodiment described above can prevent a decrease in the charging efficiency of the battery BT in a low temperature environment. The temperature of the battery BT is raised before the electric snowmobile 100 is operated, which serves to reduce the load on the battery BT at the start of operation. That is, this prevents the battery BT from consuming too much power at the start of operation.

In the present embodiment, the example has been described in which three batteries BT are provided, although the number of batteries BT is not limited to this. At least one battery may be disposed such that at least a portion of the battery is provided below the driver's seat S and above the track mechanism 30 as the battery BT.

[Outline of Embodiment]

(1) An electric snowmobile 100 proposed in the present disclosure includes a body frame 10, a driver's seat S supported by the body frame 10, an electric motor 50 supported by the body frame 10, skis 20R and 20L supported by the body frame 10, a track mechanism 30 including a track belt 31 and supported by the body frame 10 below the driver's seat S, a battery BT that is charged with electric power supplied by an external power source and capable of supplying the electric power to the electric motor 50, at least a portion of the battery BT being disposed below the driver's seat S and above the track mechanism 30, and a battery heater H that can be driven by electric power supplied from the external power source and heats the battery BT.

(2) The electric snowmobile 100 includes a BMU 90 for controlling charging of the battery BT and driving of the battery heater H, wherein the BMU 90 drives the battery heater H in a case where a temperature of the battery BT is less than a threshold Tth1 (first threshold).

(3) The BMU 90 drives the battery heater H while the battery BT is supplied with power from an external power source.

(4) In a case where a voltage Vb of the battery BT is equal to or higher than a threshold Vth1 (second threshold), the BMU 90 stops supplying electric power to the battery BT from the external power source and continues to drive the battery heater H.

(5) The electric snowmobile 100 includes a grip 41a that is gripped by a driver and a grip heater H4 that can be driven by electric power supplied from the external power source and heats the grip 41a, wherein in a case where a voltage Vb of the battery BT is equal to or higher than a threshold Tth3 (third threshold), the BMU 90 drives the grip heater H4.

(6) The electric snowmobile 100 includes a sheet heater that can be driven by electric power supplied from the external power source and heats the driver's seat S, wherein in a case where a voltage Vb of the battery BT is equal to or higher than a threshold Tth3 (third threshold), the BMU 90 drives the sheet heater.

(7) The grip heater H4 and the sheet heater can be driven by the power supplied from the battery BT.

(8) In a case where a voltage of the battery BT is equal to or higher than a threshold Vth1 (second threshold), the BMU 90 stops supplying electric power to the battery BT from the external power source and continues to drive the grip heater H4 and the sheet heater.

(9) The battery heater H is at least provided between the driver's seat S and the battery BT.

(10) The battery heater H is provided at least along the largest side surface among side surfaces of the battery BT.

(11) The battery BT has a substantially rectangular shape including a front surface, a rear surface, an upper surface, a lower surface, a right surface, and a left surface, the battery BT is supported by the body frame 10 such that widths of the upper surface, the lower surface, the right surface, and the left surface in a vehicle longitudinal direction are longer than widths of the front surface and the rear surface in a vehicle width direction, and the battery heater is provided at least along the upper surface, the right surface, and the left surface.

The present invention is not limited to embodiment described above, and various modifications can be made. For example, the configurations described in embodiment can be replaced by a configuration that is substantially the same, a configuration that provides the same action and effect, or a configuration that is capable of achieving the same object.

What is claimed is:

1. An electric snowmobile comprising:
 a body frame;
 a driver's seat supported by the body frame;
 an electric motor supported by the body frame;
 a ski supported by the body frame;
 a track mechanism, which includes a track belt, and the track mechanism being supported by the body frame below the driver's seat;
 a battery that is charged with electric power supplied by an external power source and capable of supplying the electric power to the electric motor, at least a part of the battery being disposed below the driver's seat and above the track mechanism;

a battery heater that can be driven by electric power supplied from the external power source and that heats the battery;

a controller that controls charging of the battery and driving of the battery heater by controlling a plurality of switches; and the controller is configured to independently control power supplied to the battery for charging from the external power source and electric power supplied to the battery heater from the external power source.

2. The electric snowmobile according to claim 1, wherein the controller drives the battery heater in a case where a temperature of the battery is less than a first threshold.

3. The electric snowmobile according to claim 2, wherein the controller drives the battery heater while the external power source supplies the battery with electric power.

4. The electric snowmobile according to claim 2, wherein in a case where a voltage of the battery is equal to or higher than a second threshold, the controller stops supplying electric power to the battery from the external power source and continues to drive the battery heater.

5. The electric snowmobile according to claim 4, comprising:

a grip that is gripped by a driver; and a grip heater that can be driven by electric power supplied from the external power source and that heats the grip, wherein in a case where a voltage of the battery is equal to or higher than a third threshold, the controller drives the grip heater.

6. The electric snowmobile according to claim 5, comprising:

a sheet heater that can be driven by electric power supplied from the external power source and that heats the driver's seat, wherein in a case where a voltage of the battery is equal to or higher than the third threshold, the controller drives the sheet heater.

7. The electric snowmobile according to claim 6, wherein the grip heater and the sheet heater can be driven by electric power supplied from the battery.

8. The electric snowmobile according to claim 6, wherein in a case where a voltage of the battery is equal to or higher than the second threshold, the controller stops supplying electric power to the battery from the external power source and continues to drive the grip heater and the sheet heater.

9. The electric snowmobile according to claim 1, wherein the battery heater is at least provided between the driver's seat and the battery.

10. The electric snowmobile according to claim 1, wherein the battery heater is provided at least along a largest side surface among side surfaces of the battery.

11. The electric snowmobile according to claim 1, wherein the battery has a substantially rectangular shape including a front surface, a rear surface, an upper surface, a lower surface, a right surface, and a left surface, the battery is supported by the body frame such that widths of the upper surface, the lower surface, the right surface, and the left surface in a vehicle longitudinal direction are longer than widths of the front surface and the rear surface in a vehicle width direction, and the battery heater is provided at least along the upper surface, the right surface, and the left surface.

* * * * *